Oct. 23, 1934. O. HETHERINGTON Re. 19,347

SPRING CONSTRUCTION AND METHOD OF MAKING SAME

Original Filed May 13, 1930 2 Sheets-Sheet 1

Inventor
Oliver Hetherington
By Rudolph Wm. Loe
Attorney

Oct. 23, 1934. O. HETHERINGTON Re. 19,347

SPRING CONSTRUCTION AND METHOD OF MAKING SAME

Original Filed May 13, 1930 2 Sheets-Sheet 2

Inventor
Oliver Hetherington
By Rudolph Dry
Attorney

Reissued Oct. 23, 1934 Re. 19,347

UNITED STATES PATENT OFFICE 19,347

SPRING CONSTRUCTION AND METHOD OF MAKING SAME

Oliver Hetherington, West Chester, Pa., assignor to Peerless Springs, Incorporated, West Chester, Pa., a corporation of Pennsylvania Original No. 1,888,666, dated November 22, 1932, Serial No. 451,893, May 13, 1930. Application for reissue February 17, 1934, Serial No. 711,785

11 Claims. (Cl. 5—259)

This invention generally stated, relates to a spring mat or cushion insert for upholstered articles as mattresses, motor car seats, furniture and the like, and has more particular relation to the manner of assembling the coiled springs therein.

One object of the present invention is to connect the coiled springs both longitudinally and transversely considered so that tangling of the coils is prevented, thereby to maintain the same in their original position in the unit without destroying, however, a maximum degree of flexibility in folding or rolling of the unit.

Another object is to provide a spring mat or cushion of the character stated, wherein the coils are maintained sufficiently secure against slippage with respect to one another to prevent rattling or similar noises without, however, destroying the greatest possible degree of flexibility.

A further object of the present invention is to provide a spring mat or cushion of the character stated in which a row of coiled springs may be tied together one with another longitudinally considered at their overlapped tops and bottoms and in which adjacent coils laterally considered may have their overlapped tops and bottoms tied or clamped together to provide a spring tension connection which, while positively holding the coils together against slippage, permits of a relative hinge-like action.

Other and further objects of the present invention reside in the provision of general details of construction and in the arrangement, combination, and connection of parts for attaining the results sought by the foregoing objects.

The invention consists of novel construction hereinafter described and finally claimed. In the drawings:

For the purpose of illustrating my invention, I have shown in the accompanying drawings several forms thereof, which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1:
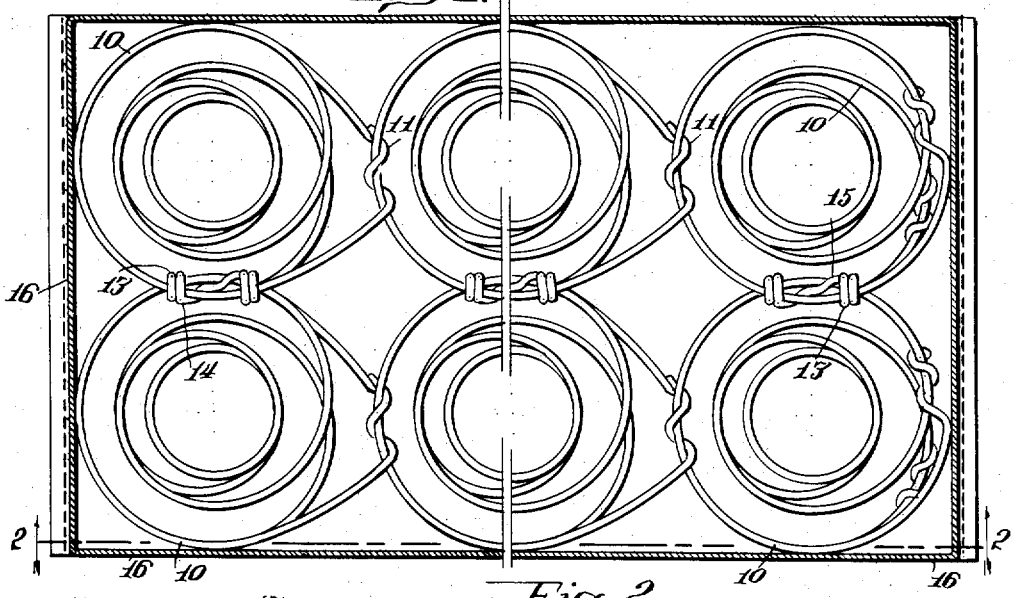
Fig. 1 is a horizontal sectional plan view of a spring mat or cushion embodying the invention and taken upon the line 1—1 of Fig. 2 looking in the direction of the arrows.
Figure 2:
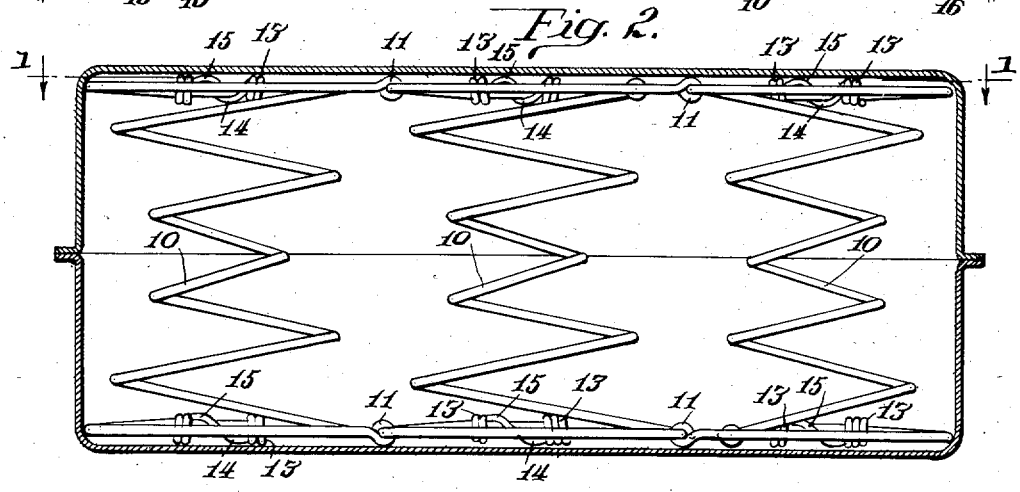
Fig. 2 is a longitudinal sectional view of a spring mat or cushion embodying the invention and taken upon the line 2—2 of Fig. 1, looking in the direction of the arrows.

Referring now to the drawings in detail, there is disclosed in Fig. 1 a longitudinally disposed row of coiled springs 10, the top and bottom strands of adjacent coils being tied together as at 11. This may be done by winding the free end of a strand of wire forming the coil around an adjacent coil so that a tight, non-slipping connection is formed, yet providing a hinge-like joint to provide maximum flexibility. The free end of a coil is tied to the upper convolution of an adjacent spring 10 and likewise the lower adjacent convolutions of springs are similarly tied together. The connection 11 just referred to may be described as being a crimped knot, and the spring convolutions both upper and lower are in different planes than are the knots themselves.

Figure 3:
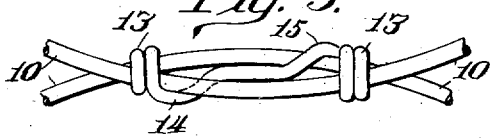
Fig. 3 is a fragmentary view in plan, drawn to an enlarged scale of one of the coil fastenings shown in Fig. 1.
Figure 4:
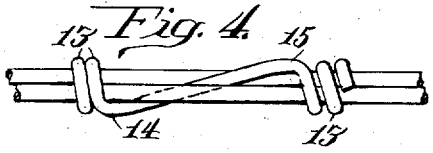
Fig. 4 is a view in elevation of Fig. 3.

There is provided a construction devoid of continuous connecting or spacing members, either rigid or flexible, but rather a construction depending on a unique form of wire-tie passed preferably diagonally through the overlapped portions of the top and bottom convolutions of the coil springs and with the free ends wound around said top and bottom convolutions outside the overlapped portions to secure spacing and connection both laterally and transversely, or laterally or transversely only, in both of which cases spacing and connection in the remaining direction is attained by knotting with a crimped knot the top and bottom spring ends to the top and bottom convolutions of an adjacent spring. As shown in said figure, there are two such rows, although the number of rows depends upon the size of spring mat or cushion to be made. Adjacent rows of coiled springs are tied together transversely so that the top and bottom coils of the springs are secured together in overlapped position. This is clearly illustrated in detail in Figs. 3 and 4. Referring to these figures, and Fig. 5, the reference numeral 12 designates a strand of wire which I wrap around the overlapped upper and lower coils of the springs 10 in spaced relation to form ring-like parts 13. That portion of the wire 12 between the ring-like parts 13 is passed upwardly through the space formed between the overlapped springs 10 by bending the wire 12 first upwardly as at 14 and then downwardly as at 15, see Fig. 4. This forms a tight clamping of parts yet forms a hinge-like connection to permit of maximum flexibility of the mat or cushion. The reference numeral 16 designates a cover for the springs 10.

Figure 5:
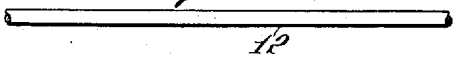
Fig. 5 illustrates in elevation one of the tie pieces shown in the foregoing figures prior to being bent to form.
Figure 6:
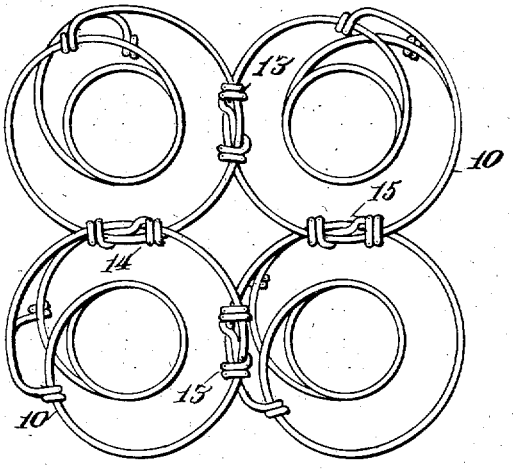
Fig. 6 is a top or plan view of a slightly modified form of coil arrangement going to make up a mat or cushion embodying the invention.

In Fig. 6 the construction of parts is the same as that just described with the exception that instead of tying together the springs 10 in rows as at 11 of the same material forming the springs, I employ a separate piece of wire as shown in Fig. 5 and bend the same in identically the same manner to form a tie connection as employed in the transverse connection of springs and the same reference numeral designates the same arrangement of parts in each instance. Thus, instead of having connected rows of coils 10, connected groups of individual coils are provided.

Figure 7:
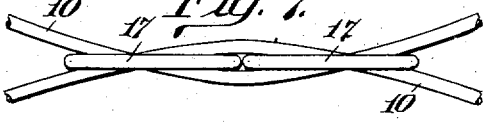
Fig. 7 is a fragmentary view in plan drawn to an enlarged scale illustrating a modified form of tie piece.
Figure 8:
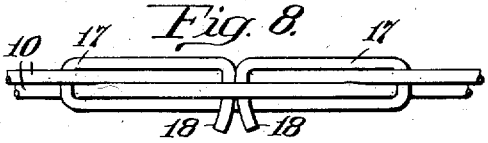
Fig. 8 is a view in elevation of Fig. 7.
Figure 9:
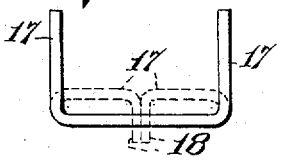
Fig. 9 is a view in elevation of the tie piece shown in Figs. 7 and 8 prior to being bent to form.

Referring now to Figs. 7, 8 and 9, instead of employing the tie wire 12 as shown in Fig. 5, I take a substantially U-shaped clip as shown in Fig. 9 and pass the arms 17 thereof through the openings formed between the overlapped portions of the springs, both at their tops and bottoms, and then bend the terminals 18 of said arms 17 in parallelism, as shown by dotted lines in Fig. 9 so that the overlapped portions of the springs 10 are securely clamped together as shown in Figs. 7 and 8.

Figure 12:
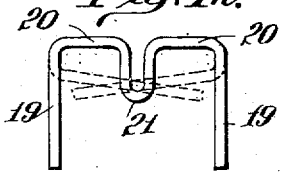
Fig. 12 is a view in elevation of the tie piece shown in Figs. 10 and 11 prior to being bent to form.
Figure 10:
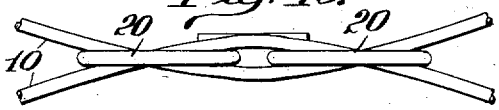
Fig. 10 is a fragmentary view in plan drawn to an enlarged scale of a still further modified form of tie piece.
Figure 11:
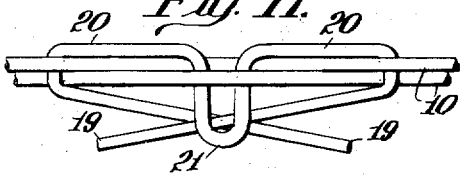
Fig. 11 is a view in elevation of Fig. 10.

Referring now to Figs. 10, 11 and 12, I employ a substantially inverted U-shaped clip instead of the clip just described. The arms 19 of this clip have extensions 20 extended toward one another and bent U-shaped fashion as at 21, see Fig. 12. In practice the overlapped portions of the springs 10 both at their tops and bottoms have projected therebetween a clip of this character and the terminals of said arms 19 bent toward one another, at an inclination as shown by dotted lines in Fig. 12 adjacent the U-shaped projection 21 to securely clamp said springs 10 together.

Figure 13:
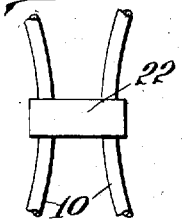
Fig. 13 is a top or plan view of a pair of coils clamped together by means of a clip.
Figure 14:
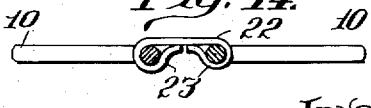
Fig. 14 is a cross-sectional view of Fig. 13.

Referring now to Figs. 13 and 14, the springs 10 are clamped together by means of a flat metal strip 22, the terminals 23 of which are bent around the springs 10 both at their tops and bottoms. It will be understood that these strips 22, as well as the devices shown in Figs. 9 and 12, may be applied to the springs 10 in the manner of tying the springs together as shown in either Figs. 1 or 6. In general, any of the methods of independent tying depicted may be used in tying the upper and lower concentric coils at the overlapped position but in particular, claim is made for the method of passing a wire preferably diagonally through the overlapped portion which is not distorted and winding it around both adjacent coils outside of the overlapped section in such a manner as to produce a hinge-joint giving an easy and free hinge action, and at the same time tightly enough to produce sufficient tension whereby the adjacent coils of the spring mat or cushion tend to return to a position substantially in the same plane after being forced from it by pressure or flexure or otherwise moving the spring structure.

I claim as my invention:

1. A self supporting spring cushion or mat consisting of spiral springs the upper and lower adjacent coils of which overlap, a wire arranged diagonally through said overlapped portions the respective ends of said diagonal wire being wound around said adjacent coils to provide a hinge-joint.

2. A self supporting spring cushion or mat comprising a group of at least four double conical springs, adjacent pairs of springs in one direction being arranged with overlapping upper and lower convolutions, said overlapped portions having a wire passed diagonally therethrough and with the respective ends of each diagonal wire wound around adjacent convolutions outside of said overlapped portions to provide a hinge-joint, and adjacent pairs of springs in the opposite direction being tied together to also provide a hinge-joint.

3. A hinge joint connecting a pair of conventional upholstery springs having the normal spiral curvature of their end-coils preserved comprising a part disposed to maintain the end coils of said springs in partially overlapped relation to each other, and a portion at each side of said part completely encircling and closely embracing the portions of the said end coils at points of their contact with each other and pivotally connecting the same with each other at said points, said portions cooperating with said part for preventing all relative lateral movement of said springs.

4. The combination with a pair of conventional upholstery springs having undistorted end-coils arranged with the end coil of each thereof overlapping the other, of a hinge member having its end portions coiled about and closely embracing said end coils at their points of contact with each other for pivotally connecting the same, the middle portion of said hinge member projecting between the overlapped portions of said end coils for maintaining the same in overlapped position and for maintaining said coiled end portions in fixed relative positions.

5. The combination with a pair of conventional upholstery springs having normally spiral end coils and arranged with an end coil of each thereof overlapping the other, of a wire hinge member having its respective end portions coiled about and firmly embracing said end coils at their points of contact with each other.

6. The combination with a pair of conventional upholstery springs having end coils of normal spiral contour and a portion of an end coil of each of said respective springs thereof overlapped upon each other and presenting an open space bordered by said overlapped portions, of a hinge member having end portions coiled about and completely encircling and closely embracing said overlapped portions at the respective ends of said open space and presenting an intermediate portion projecting into said open space.

7. A spring connecting hinge joining the overlapped end coils of a pair of conventional upholstery springs which comprises a wire member having a middle portion disposed between the overlapped portions of the springs for maintaining the latter in overlapped relation, and having end portions coiled about and formed into hinge members completely encircling and closely embracing the contacting portions of said end coils.

8. A spring assembly including a pair of conventional upholstery springs having undistorted end coils disposed to overlap each other to present an opening bordered by arcuate portions of said end coils, an initially straight piece of wire having its middle portion disposed in said opening and its end portions coiled to completely encircle and firmly embrace the said overlapped portions of said springs at the respective ends of said opening, said middle portion maintaining said overlap and preventing said coiled end portions from moving toward or away from each other.

9. A spring assembly comprising a plurality of rows of conventional upholstery springs each having the extremity of a terminal convolution thereof coiled about the terminal convolution of an adjacent spring, the normal spiral contour of said terminal convolutions being preserved, said rows of springs being disposed parallel with each other and with the terminal convolutions of the springs of one row partially overlapping the terminal convolutions of the springs of an adjacent row, a hinge member completely encircling and closely embracing each point of contact between overlapped springs for pivotally connecting the same at spaced apart points, and means for maintaining said hinge members in fixed spaced relation to each other thereby to prevent lateral movement of the springs relatively to each other, said hinge members cooperating with the first mentioned connections to prevent permanent distortion of the completed assembly.

10. A spring assembly comprising a plurality of upholstery springs arranged in pairs disposed with an end coil of one spring of each pair overlapping an end coil of the other, said overlapped portions defining an opening at the ends of which said end coils are in contact with each other, and hinge members each including portions completely encircling and tightly embracing the overlapped end coils at their said points of contact and a spacing bar interposed between and connected with said encircling portions for maintaining the latter in fixed spaced relation to each other.

11. In a structure of the character described, a pair of springs having adjacent coils engaged at spaced points, means for hingedly tieing said coils together at said engaged points, including a plurality of closely engaging coiled wrappings encircling and tightly embracing the coils at said points, and a spacing member holding said wrappings at said spaced points and in correspondingly spaced relationship.

OLIVER HETHERINGTON.